(12) United States Patent
Mantin (10) Patent No.: US 9,432,731 B2
(45) Date of Patent: Aug. 30, 2016

(54) METHOD AND SYSTEM FOR DETECTING LIVE OVER THE TOP (OTT) STREAMS IN COMMUNICATIONS NETWORKS

(71) Applicant: imVision Software Technologies Ltd., Ramat Gan (IL)

(72) Inventor: Sharon Mantin, Tel Aviv (IL)

(73) Assignee: Imvision Software Technologies Ltd., Ramat Gan (IL)

( * ) Notice: Subject to any disclaimer, the term of this patent is extended or adjusted under 35 U.S.C. 154(b) by 0 days.

(21) Appl. No.: 14/332,712

(22) Filed: Jul. 16, 2014

(65) Prior Publication Data

US 2015/0026748 A1 Jan. 22, 2015

Related U.S. Application Data

(60) Provisional application No. 61/847,557, filed on Jul. 17, 2013.

(51) Int. Cl.
*H04N 7/173* (2011.01)
*H04N 21/442* (2011.01)
*H04N 21/458* (2011.01)
*H04N 21/44* (2011.01)
*H04N 21/24* (2011.01)
*H04N 21/234* (2011.01)
*H04N 21/658* (2011.01)

(52) U.S. Cl.
CPC ...... *H04N 21/442* (2013.01); *H04N 21/23418* (2013.01); *H04N 21/2407* (2013.01); *H04N 21/44008* (2013.01); *H04N 21/458* (2013.01); *H04N 21/6581* (2013.01)

(58) Field of Classification Search
CPC ............. H04N 21/23418; H04N 21/2407; H04N 21/44008; H04N 21/442
USPC .............. 725/19, 22, 86, 105, 116, 93
See application file for complete search history.

(56) References Cited

U.S. PATENT DOCUMENTS 7,082,142 B1 * 7/2006 Begeja ............... H04N 7/17318
348/E7.071
7,698,724 B1 * 4/2010 Day ................... H04N 7/17336
725/101

(Continued)

FOREIGN PATENT DOCUMENTS

JP 2004080566 A * 3/2004
WO 2013037032 A1 3/2013

OTHER PUBLICATIONS

The International Search Report and the Written Opinion of the International Search Authority, PCT/US2014/046850, Date of Mailing Oct. 16, 2014.

(Continued)

*Primary Examiner* — James R Sheleheda
(74) *Attorney, Agent, or Firm* — M&B IP Analysts, LLC (57) ABSTRACT

A system and method for detecting a live over-the-top (OTT) stream are provided. The method includes analyzing a received request for an OTT stream; requesting a plurality of time-shifted OTT streams respective of the requested OTT stream when the analysis of the received request indicates that the requested OTT stream is suspected as a live OTT stream; analyzing the plurality of time-shifted OTT streams, wherein each analysis of a suspected live OTT stream results in a definitive indication of whether the requested OTT stream is a live OTT stream.

25 Claims, 7 Drawing Sheets

(56) References Cited

U.S. PATENT DOCUMENTS

| | | | |
|---|---|---|---|
| 8,117,259 B2* | 2/2012 | Macwan | H04N 21/63 709/203 |
| 8,826,349 B2* | 9/2014 | Joe | H04N 21/44209 725/93 |
| 2009/0300185 A1* | 12/2009 | Letellier | H04L 12/1886 709/227 |
| 2010/0077438 A1 | 3/2010 | Ansari | |
| 2010/0211794 A1* | 8/2010 | Bilobrov | G06K 9/00067 713/176 |
| 2010/0250772 A1 | 9/2010 | Mao | |
| 2012/0131623 A1 | 5/2012 | McDysan et al. | |
| 2012/0198506 A1* | 8/2012 | Joe | H04N 21/44209 725/97 |
| 2012/0317605 A1 | 12/2012 | Brogan | |
| 2013/0067109 A1 | 3/2013 | Dong et al. | |
| 2013/0070622 A1* | 3/2013 | Degioanni | H04L 67/1097 370/252 |
| 2013/0108173 A1* | 5/2013 | Lienhart et al. | 382/195 |
| 2013/0132986 A1* | 5/2013 | Mack | H04L 65/605 725/14 |
| 2013/0268986 A1* | 10/2013 | Venkatachalam et al. | 725/109 |
| 2013/0276017 A1* | 10/2013 | Walker | H04N 21/44204 725/25 |
| 2013/0276035 A1* | 10/2013 | Walker | H04N 21/44204 725/62 |
| 2014/0129570 A1 | 5/2014 | Johnson | |
| 2014/0129680 A1* | 5/2014 | Mukherjee | H04L 65/607 709/219 |
| 2014/0348165 A1* | 11/2014 | Frydman et al. | 370/390 |
| 2015/0026748 A1* | 1/2015 | Mantin | H04N 21/6581 725/116 |
| 2015/0029925 A1* | 1/2015 | Mantin | H04L 65/608 370/312 |
| 2015/0049762 A1* | 2/2015 | Mantin | H04L 65/4076 370/390 |
| 2015/0201225 A1* | 7/2015 | Yin | H04N 21/23439 725/95 |
| 2015/0331942 A1* | 11/2015 | Tan | G06F 17/30784 386/241 |

OTHER PUBLICATIONS

Bouten et al., "A Multicast-Enabled Delivery Framework for QoE Assurance of Over-the-Top Services in Multimedia Access Networks"; Journal of Network and Systems Management, DOI 10.1007/s10922-013-9262-8, published online Jan. 17, 2013; Springer Science+Business Media, New York.

* cited by examiner

METHOD AND SYSTEM FOR DETECTING LIVE OVER THE TOP (OTT) STREAMS IN COMMUNICATIONS NETWORKS

CROSS REFERENCE TO RELATED APPLICATIONS

This application claims the benefit of U.S. Provisional Application No. 61/847,557 filed Jul. 17, 2013, the contents of which are incorporated by reference.

TECHNICAL FIELD

The invention relates generally to the delivery of over-the-top (OTT) content in communication networks and, more particularly, to self-detection of live, linear, and replicated OTT streams in such networks.

BACKGROUND

The world of digital delivery of multimedia content to viewers has been rapidly progressing. Typical types of multimedia content include video clips, electronic games, and interactive content. The delivery process for such multimedia content, particularly those transmitted in a form of video, may entail use of a variety of delivery standards, video quality levels, and other parameters. The techniques used in traditional television (TV) broadcast cannot be effectively used in the more modern multi-standard digital TV arena. Currently, only piecemeal solutions are available for efficient and seamless delivery of such multimedia content, to the arena of digital TV.

Specifically, content delivery is currently performed using two approaches: legacy content distribution and over-the-top (OTT) content distribution. Legacy content providers include, for example, cable, satellite, and internet protocol TV (IPTV) providers. Typically, such providers have full control over the entire delivery chain, from a central location from where the content is originated and transmitted (head-end) through the network to the end user's device (e.g., a set-top box). Therefore, legacy content providers can manage and guarantee efficient content delivery mechanisms and high Quality of Experience (QoE) to the end user.

Over-the-top (OTT) content distribution is the delivery of audio, video, and other types of multimedia content over the Internet without any control of the content distribution by the network operators and/or by the content providers. The providers of OTT content are third party providers which utilize the network's infrastructure to provide content to their subscribers. As such, OTT content providers are not responsible for controlling redistribution of the content. Examples for OTT content providers are Hulu®, Netflix®, and the like.

In most cases, OTT content providers control only the edges of a content distribution network. These edges are streaming servers at the head-end and the media players installed in user devices. However, as noted above, OTT content providers have no control over the distribution network. Rather, such providers merely utilize the network's infrastructure to deliver content. As such, OTT content providers are not responsible for the overall efficiency of OTT content distribution over the network and, as such, cannot guarantee high QoE to their subscribers.

The popularity of OTT services downgrades the performance of the communication networks managed by ISPs. Specifically, OTT content delivery significantly increases the bandwidth consumption in such networks. As a result, ISPs cannot ensure high Quality of Services (QoS) to their subscribers, thereby forcing ISPs to upgrade their networks to support the increased demand for bandwidth. In addition, congested networks cause to higher packets loss and longer packet delays, thereby downgrading the QoE of OTT streaming services.

A key to any solution for reducing traffic load due to OTT content requires understanding of the type of the content being utilized. The type of the streamed content may be live, linear, replicated, or recorded. A live OTT stream is a transmission of a live event (e.g., a sports match, a concert, and so on). A linear stream is a broadcasted content, such as a TV show broadcasted over the Internet. In both live and linear OTT streams all viewers watch the same stream at the same time. In contrast, recorded content such as, e.g., content from a video on demand (VoD) service may be viewed by different viewers in asynchronous manners, i.e., each user can start watching the recorded content at any time, and the viewing times of users may only overlap partially or not at all.

One approach for detecting the type of stream being distributed is based on caching the stream's content and generating a signature for a portion of the cached content. The signature is used to determine if the content was previously requested, and, if so, whether the content is being served from the caching server. The drawback of this solution is that it cannot determine if the requested content is live or linear, as the signatures represent only a segment of the content. For example, a signature can be generated for a first segment (e.g., the first 50 KB) of a video, but for continuous live streams that viewers can start watching at any point in time, the first segment may be determined to be a portion of the stream beginning with the point at which the user started viewing rather than the beginning of the entire stream. Hence, signatures generated for a first segment are meaningless.

It would be therefore advantageous to provide a solution that overcomes the deficiencies of prior art solutions by permitting detection of live, linear and replicated OTT streams in communication networks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some aspects may be used herein to refer to a single aspect or multiple aspects of the disclosure.

The disclosure relates in various embodiments to method for detecting a live over-the-top (OTT) stream. The method comprises analyzing a received request for an OTT stream; requesting a plurality of time-shifted OTT streams respective of the requested OTT stream when the analysis of the received request indicates that the requested OTT stream is suspected as a live OTT stream; analyzing the plurality of time-shifted OTT streams, wherein each analysis of a suspected live OTT stream results in a definitive indication of whether the requested OTT stream is a live OTT stream.

The disclosure further relates in various embodiments to a system for detecting a live over-the-top (OTT) stream. The system comprises a processing unit; and a memory, the memory containing instructions that, when executed by the processing unit, configure the system to: analyze a received request for an OTT stream; request a plurality of time-shifted OTT streams respective of the requested OTT stream, when the analysis of the received request indicates that the requested OTT stream is suspected as a live OTT stream; analyze the plurality of time-shifted OTT streams, wherein each analysis of a suspected live OTT stream results in a definitive indication of whether the requested OTT stream is a live OTT stream.

The disclosure further relates in various embodiments to an apparatus that includes a processing unit; and a memory, the memory containing instructions that, when executed by the processing unit, configure the system to: receive a request for an over-the-top (OTT) stream; apply a filter to determine if the requested OTT stream is suspected as a live OTT stream; extract at least content identification (ID) from the suspected live OTT stream; count a number of requests to a stream having the extracted content ID; and trigger the analysis of the plurality of time-shifted OTT streams when the number of requests exceed a predefined threshold.

The disclosure further relates in various embodiments to an apparatus that includes a processing unit; and a memory, the memory containing instructions that, when executed by the processing unit, configure the system to: request a plurality of time-shifted over-the-top (OTT) streams respective of the requested OTT stream; extract a bit stream from each of the plurality of time-shifted OTT streams; compare the extracted bit streams to each other; and determine the requested OTT stream to be a live stream if the extracted bit streams are substantially matched.

BRIEF DESCRIPTION OF THE DRAWINGS

The subject matter disclosed herein is particularly pointed out and distinctly claimed in the claims at the conclusion of the specification. The foregoing and other objects, features, and advantages of the embodiments disclosed herein will be apparent from the following detailed description taken in conjunction with the accompanying drawings.

DETAILED DESCRIPTION

Various embodiments of the disclosure are described below. It should be apparent that the teachings herein may be embodied in a wide variety of forms and that any specific structure, function, or both being disclosed herein is merely representative. Based on the teachings herein, one skilled in the art should appreciate that an embodiment disclosed herein may be implemented independently of any other embodiments and that two or more of these embodiments may be combined in various ways. For example, an apparatus or a system may be implemented or a method may be practiced using any number of the embodiments set forth herein. In addition, such an apparatus or system may be implemented or such a method may be practiced using other structure, functionality, or structure and functionality in addition to or in place of one or more of the embodiments set forth herein. Furthermore, any aspect disclosed herein may be embodied by one or more elements of a claim.

The embodiments disclosed herein are examples of the many possible advantageous uses and implementations of the innovative teachings presented herein. In general, statements made in the specification of the application do not necessarily limit any of the various disclosed embodiments. Moreover, some statements may apply to some inventive features but not to others. In general, unless otherwise indicated, singular elements may be in plural and vice versa with no loss of generality. In the drawings, like numerals refer to like parts through several views.

As an example of the above, in some embodiments, a method and system for self-detection of live and linear OTT streams in communications networks are provided. In an embodiment, requests for OTT streams from users are received and analyzed to determine if there is a high probability that the request OTT stream is for a live, linear, or replicated stream. If so, two or more time shifted instances of the requested OTT stream are further analyzed to confirm that the requested OTT stream is not of a recorded content.

Figure 1:
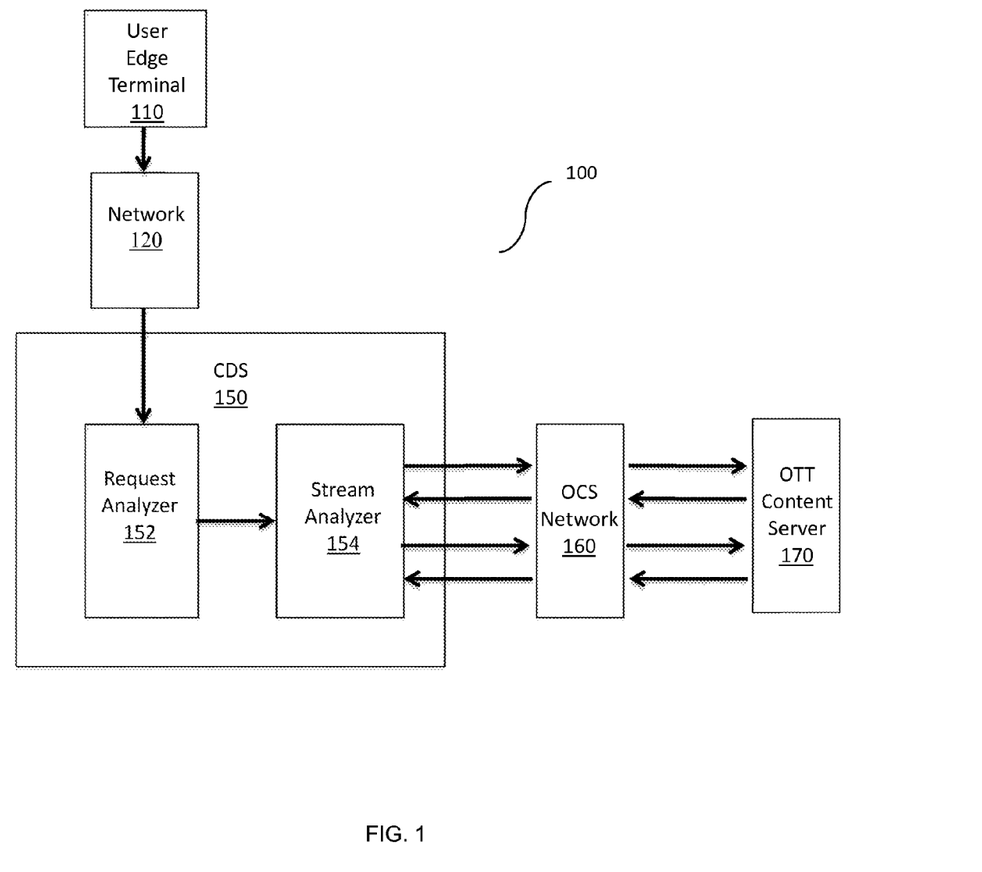
FIG. 1 is a diagram of a content distribution network utilized to describe the various disclosed embodiments.

FIG. 1 is an exemplary and non-limiting diagram of a content distribution network 100 utilized to describe the various embodiments disclosed herein. In an exemplary implementation, the network 100 includes a user edge terminal 110 configured to play content (e.g., video content) streamed by an OTT content provider from an OTT content server (OCS) 170. The user edge terminal 110 may be, but is not limited to, a PC, a smart phone, an electronic kiosk, a tablet computer, a wearable computing device, and the like. The user edge terminal 110 is configured to execute a media-player from any one of a web-browser, an application (e.g., a mobile app), and the like.

The user edge terminal 110 is further connected to a first network 120. In an exemplary embodiment, the first network 120 may be any broadband network including, but not limited to, a wireline, wireless, cable, fiber optic, or any other network. Typically, such a network includes several network elements including, but not limited to, switches, routers, DSLAMs, CMTS, BTS, and so on, through which the end user sends and receives data to and from the internet. The first network 120 is typically operated by an ISP.

At the other end of the system, the OTT content server 170 is also communicatively connected to a content detection system (CDS) 150 through a second network 160. The second network 160 may be a local area network, a wide area network (WAN), a metropolitan area network (MAN), the Internet, and the like. The OTT content server 170 locally hosts or receives the multimedia content from its origin (e.g., a studio) in real-time. The server 170 is configured to stream this content as an OTT content stream to the end users over the network 120 and 160. OTT content servers (e.g., server 170) are typically deployed in datacenters in different geographical locations. Although not shown in FIG. 1, OTT content servers are typically connected to CDNs.

In an embodiment, the CDS 150 is configured to execute the embodiments of self-detecting a live, linear, or replicated OTT stream (such streams commonly referred to hereinafter as a "live OTT stream") in a multimedia (video and/or audio) stream (hereinafter the "OTT stream" or "OTT streams") transmitted by the OTT content server 170. It should be noted that only one user terminal 110 and one OTT content server 170 are illustrated in FIG. 1 merely for the sake of simplicity of the description. The disclosed techniques can be utilized when multiple user terminals are connected to the CDS 150 where multiple streams can streamed from a plurality of OTT content servers.

In one exemplary implementation, the CDS 150 includes a request analyzer 152 and a stream analyzer 154. The request analyzer 152 is configured to receive a request for OTT streams from the user terminal 110 and to analyze the requests to determine if there is a probability that the requested OTT stream is a live OTT stream.

In an embodiment, the request analyzer 152 is configured to analyze requests generated by the user terminal 110 and the server's 170 responses to detect suspected requests for live OTT streams. In one embodiment, the request analyzer 152 is configured to utilize heuristics to detect suspected requests. The heuristics may be selected based on the streaming protocols utilized by the server 170. The operation of the request analyzer 152 and the heuristics applied by the analyzer 154 are discussed in greater detail herein below with respect to FIG. 2.

The stream analyzer 154 is configured to retrieve multiple copies of the requested OTT stream from the server 170 through the network 160 and analyze the retrieved streams. The copies of the streams are typically time shifted. The stream analyzer 154 is configured to search for similar content in the time-shifted streams indicating whether the requested OTT stream is a live OTT stream. In an embodiment, the operation of the stream analyzer 154 is triggered by the request analyzer 152. The operation of the stream analyzer 154 is discussed in greater detail herein below with respect to FIG. 5.

The CDS 150 also comprises one or more network interfaces (not shown) to interface with networks 120 and 160, one or processing systems (not shown), a memory (not shown), and a storage unit (not shown). In some implementations, each of the request analyzer 152 and the stream analyzer 154 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
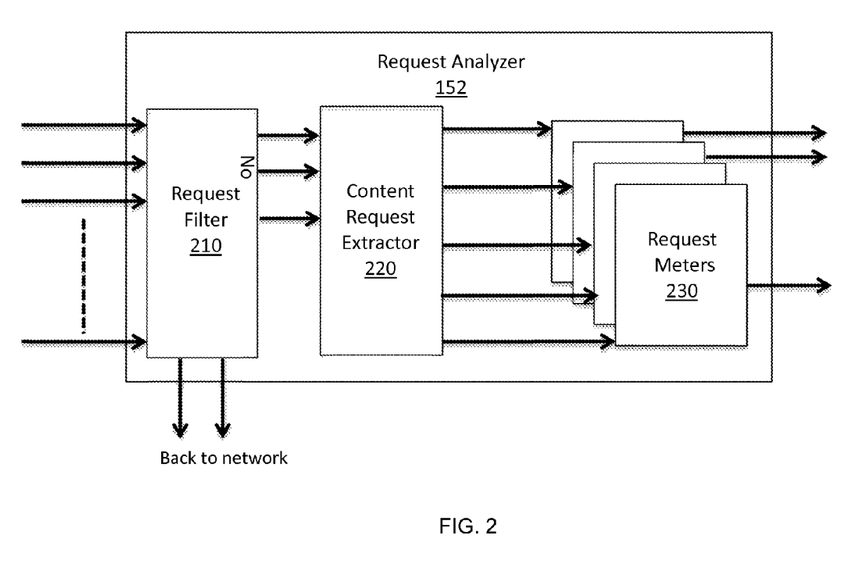
FIG. 2 is a block diagram of the request analyzer structured according to one embodiment.

FIG. 2 is an exemplary and non-limiting block diagram of the request analyzer 152 configured according to one embodiment. The request analyzer 152 includes a request filter 210, a content request extractor 220, and a plurality of request meters (collectively shown as request meters 230). In an embodiment, the request filter 210 is configured to filter out request messages of on-going sessions received from one or more user terminals and transparently resend these requests to their final original destination through the network. As on example one of the filters is configured to detect suspected request is that the HTTP get request message containing file name with a prefix of 'M3U8' for an OTT content server 170.

In one embodiment, the content request extractor 220 is configured to receive new requests and extract the content identification (ID) from those requests. The content ID is typically included in the header of the request message. Such content ID may be, for example, an OTT content provider identification, a movie ID, and the like.

In an embodiment, a plurality of request meters 230 may be utilized to measure the number of requests received for a specific content identification, during a configurable time period. In an exemplary implementation, each request meter 230 is configured to measure the number of requests for a specific requested content (by its content ID) during a time period of, e.g. 20 minutes. If during that time period the number of requests exceeds a configurable threshold, a request meter 230 is configured to declare the requested specific content ID as "suspected" and to trigger the operation of stream analyzer 154.

Figure 3:
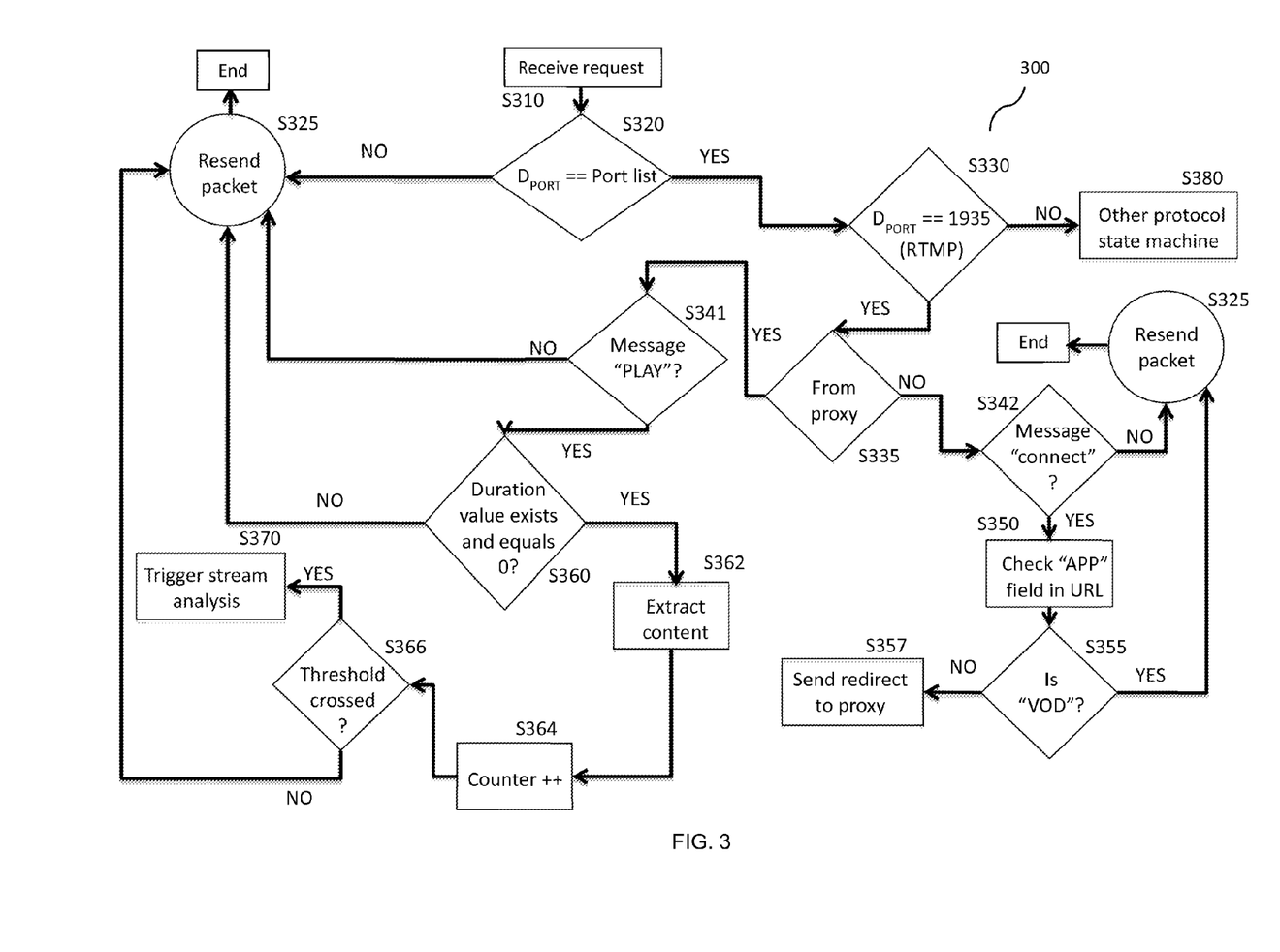
FIG. 3 is a flowchart illustrating the operation of the request analyzer according to one embodiment.

FIG. 3 is an exemplary and non-limiting flowchart 300 illustrating the operation of the request analyzer 154 according to one embodiment. At S310, a request for an OTT stream is received. The request is typically initiated by a user terminal and forwarded to the request analyzer 154. In one embodiment, the request can be forwarded from a deep packet inspection (DPI) element, a service chaining element, or a routing network element. The forwarding decision by any of these elements is based on a destination IP address designated in the request. The destination IP address may be, for example, of an OTT content server (e.g., server 170).

At S320, a destination port ID of the destination IP address is checked against a set of pre-configured destination ports IDs designated and those which require further analysis is required. If a match does not exist, execution continues with S325; otherwise, execution continues with S330.

As S325, the request is relayed to a network (e.g., the second network 160) without any further analysis. Then, execution terminates.

At S330, another check is made to identify the type of content delivery protocol being utilized. In an embodiment, the identification is based on a value of the destination port ID. For example, if the port ID value is '1935', the content delivery protocol is a real time messaging protocol (RTMP). If the content delivery protocol is a HTTP live streaming (HLS) protocol, the port value is '8080. The operation of the request analyzer 154 when the HLS protocol is utilized is discussed in greater detail below with respect to FIG. 4.

At S335, a source of the request is determined respective of the identified protocol. For example, when a RTMP protocol is identified, a check is made to determine if the source of the request is either a media-player or a proxy, wherein both are typically deployed at the use terminal. In such a case, the identification of the source is designated in the request's header.

At S341 and S342, the type of the request is determined respective of the identified protocol. As a non-limiting example, a RTMP protocol is identified as the type of request can be 'play', 'connect', or other types of messages. The type of the request is based on a source of the request. Typically, a RTMP 'connect' request is initiated by the player and not by a proxy. If the request's type is not an actionable type of protocol (e.g., if the request is neither 'connect' nor 'play'), in S325, the request is sent back to the network.

Execution reaches S350 when the type of the request is 'connect' and the source of the request is a player in a user terminal. At S350, the header is searched for an identifier indicating the request is not related to any of live OTT stream. For example, an APP field in an RTMP request's header designated with 'VOD' indicates that the request may not be a live OTT stream. At S355, a check is made to determine if such an identifier has been found and, if so, execution continues with S325; otherwise, execution continues with S357. In S357, a redirect message indicating that the request is suspected to be a request for a live OTT stream is sent to the user terminal with the address of the proxy. Streams received from the proxy can later trigger the operation of the stream analyzer.

Execution reaches S360 when the type of the request is 'play' and the source of the request is a proxy. At S360, a check is made to determine if a duration parameter in a header of the received RTMP PLAY request exists and is equal to zero. If so, at S362, a content ID is extracted from the request; otherwise, execution terminates. At S364, a counter associated with the extracted content ID is incremented. In an embodiment, if such a counter does not exist, a new counter may be created and initialized to zero.

At S366, the counter value is compared against a predefined threshold. If the counter's value is greater than the threshold, the received request is for a live OTT stream. Thus, at S370, further analysis by the stream analyzer 152 is triggered.

If either of S360 and S366 results with a No answer, execution continues with S325, where the request is relayed back to the network.

Figure 4:
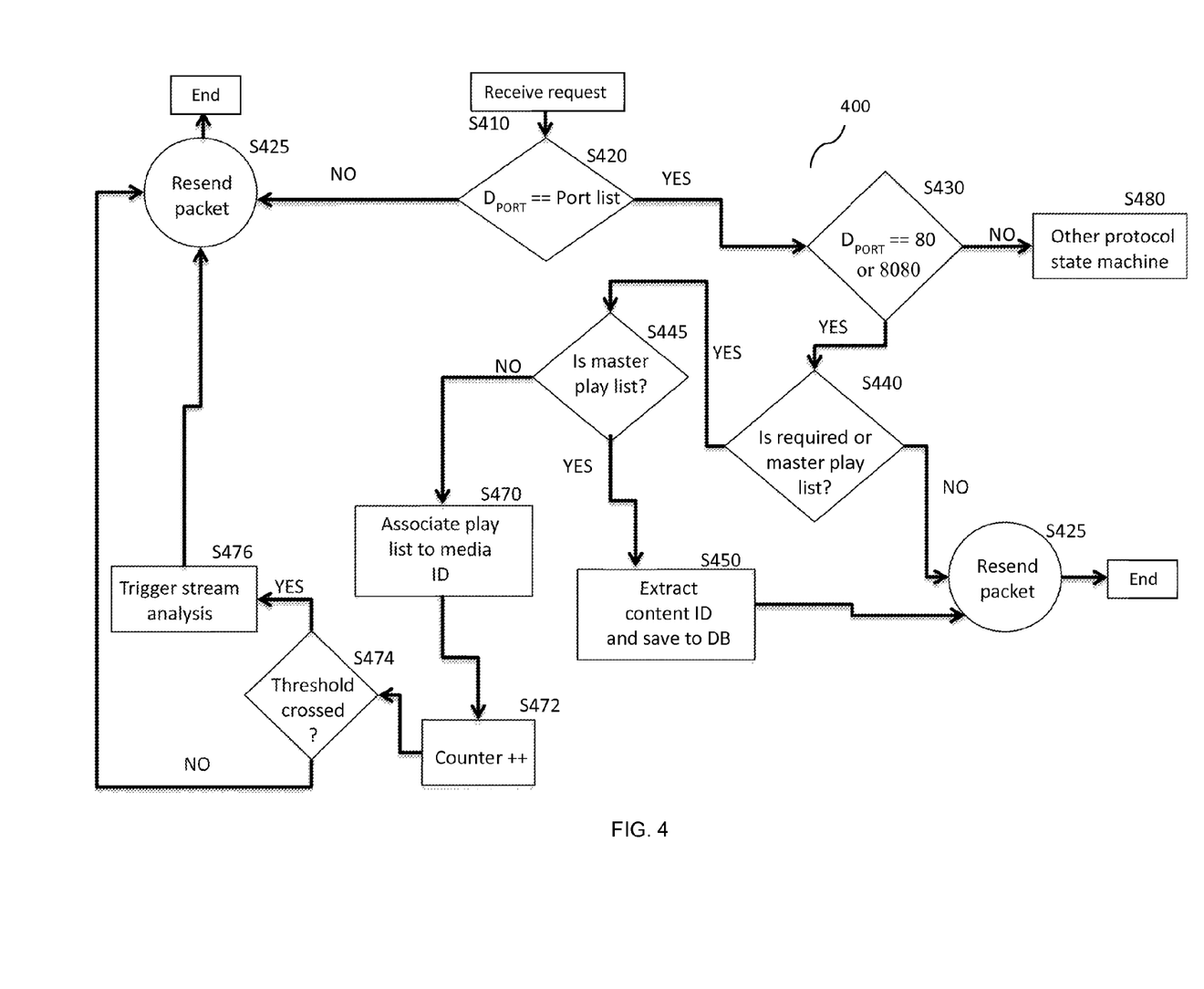
FIG. 4 is a flowchart illustrating the operation of the request analyzer according to an embodiment.

FIG. 4 is a non-limiting and exemplary flowchart 400 illustrating the operation of the request analyzer 154 according to another embodiment. In this embodiment, the content deliver protocol being utilized is a HLS protocol.

At S410, a request for OTT content is received. The request is typically initiated by a user terminal and is forwarded to the CDS 150. In one embodiment, the request can be forwarded from a deep packet inspection (DPI) element, a service chaining element, or a routing network element. The forwarding decision by any of these elements is based on a destination IP address designated in the request. The destination IP address may be, for example, an IP address of an OTT content server (e.g., server 170).

At S420, an IP address of a destination port ID is checked against a set of pre-configured destination ports IDs designated as those which require further analysis is required. If a match does not exist, at S425, the request is relayed back to the network (e.g., network 160) without any further analysis; otherwise execution continues with S430.

At S430, another check is made to identify the type of content delivery protocol being utilized. In an embodiment, the identification is based on a value of the destination port ID. In the case of HLS protocol, the port value should be '8080' or '80'.

At S440, when the identified protocol is HLS, it is checked if the request type is either for a 'master play list' or a 'required play list'. If not, execution continues with S425; otherwise, at S445, a check is made to determine if the request type is 'master play list'. If so, execution continues with S450; otherwise, execution continues with S470.

When the request type is 'master play list', at S450, the content identification is extracted and saved in a database or in a memory of the request analyzer. Then, execution returns to S425.

At S470, the requested play list is associated with one of the extracted saved content IDs. At S472, a counter associated with the extracted content ID is incremented. In an embodiment, if such counter does not exist, a new counter is created and initialized to zero. At S474, the counter value is compared against a predefined threshold. If the counter's value is greater than the threshold, the received request is for a live OTT stream. Thus, at S476, the request is further analyzed by the steam analyzer. If S474 results with a No answer, execution continues with S425, where the request is relayed back to the network.

It should be noted that the embodiments discussed above with respect to FIGS. 3 and 4 are related to the operation of RTMP and HLS protocols. However, one of ordinary skill can adapt the disclosed embodiments to other types of streaming protocols. As non-limiting examples, the disclosed embodiments can be utilized in streaming protocols including, but not limited to, real time streaming protocol (RTSP), HTTP dynamic streaming, moving picture experts group (MPEG)-dynamic adaptive streaming over HTTP (DASH), and the like.

Figure 5:
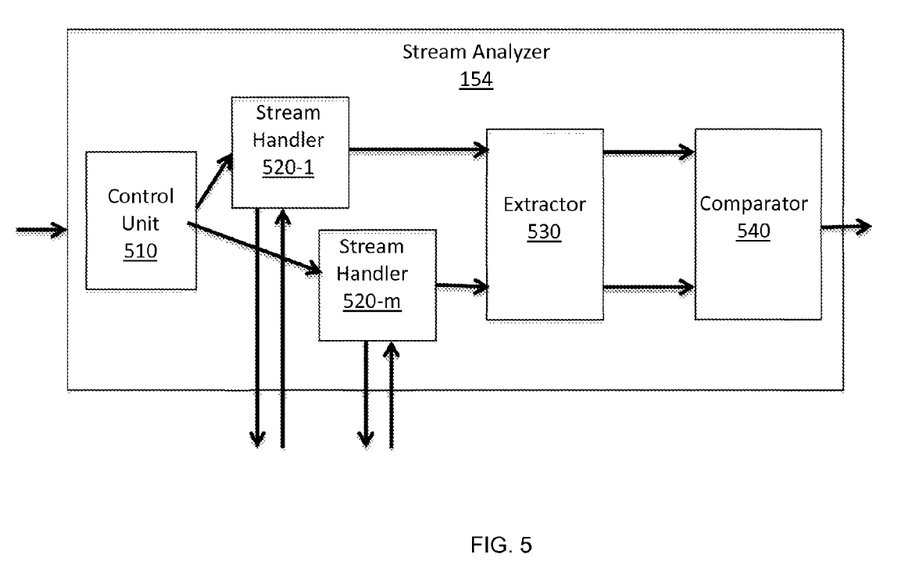
FIG. 5 is a block diagram of the stream analyzer implemented according to one embodiment.

FIG. 5 is an exemplary and non-limiting block diagram of the stream analyzer 154 implemented according to one embodiment. The stream analyzer 154 includes a control unit 510, a plurality of stream handlers 520-1 through 520-$m$, an extractor 530, and a comparator 540.

In an exemplary embodiment, the control unit 510 is configured to receive a trigger from the request analyzer 152. The trigger includes information about the suspected OTT stream such as ID, URL, and APP information. Then, the control unit 510 is configured to activate at least two of the stream handlers 510-1 through 510-$m$ to send a request to the OTT stream corresponding to the suspected OTT stream from the respective OTT content server. The requests to suspected OTT streams are typically performed at a predefined time shift from each other. For example, the stream handler 510-1 may request the stream at time $T_1$, while the handler 510-$m$ may request the stream at time $T_1+5$ seconds. Alternatively, the stream analyzer 154 is configured to initiate at least two user terminals to request at least two OTT streams with a time shift between these streams. In an embodiment, the time shift between the at least two OTT streams is determined based on a global time stamp. The global time stamp is associated with a play list or a master play list of the at least two requested OTT streams. The extractor 530 is configured to receive the streams $S_1$ through $S_P$ having time shifts relative to each other, and to generate bit stream sequences $(SQ_1, \ldots, SQ_p)$ for each respective stream $(S_1$ through $S_m)$. In one embodiment, the extracted bit stream sequences are I/B/P frame sequences. It should be appreciated an I/B/P frame sequence provide a unique representation of the content at any point in time that the content is being played. In one implementation, the extractor 530 is realized as a decoder.

The comparator 540 is configured to compare the extracted bit stream sequences $(SQ_1$ through $SQ_m)$ to determine if the suspected OTT stream is a live OTT stream. The operation of the comparator 540 is discussed in further detail below with respect to FIG. 6.

Figure 6:
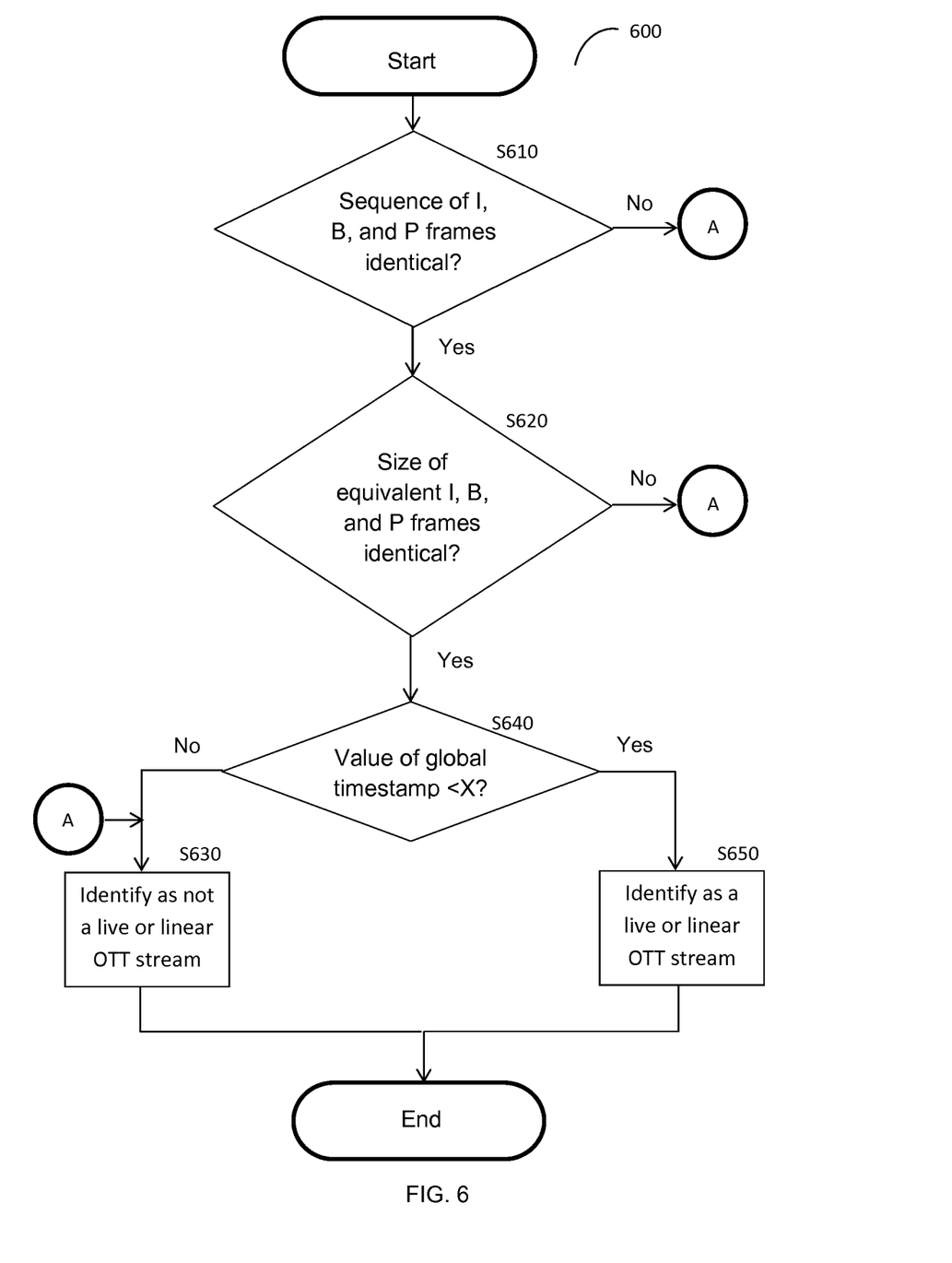
FIG. 6 is a flowchart illustrating the operation of the comparator depicted in FIG. 5.

FIG. 6 is an exemplary and non-limiting flowchart 600 illustrating the operation of the comparator 540. In this exemplary embodiment, two I/B/P frame sequences $SQ_1$ and $SQ_P$ are compared.

At S610, at least two I/B/P sequences $SQ_1$ and $SQ_m$ are compared to each other. If the sequences $SQ_1$ and $SQ_P$ are identical, execution continues with S620; otherwise, at S630, the stream analyzer 154 declares that the tested content is not a live OTT stream.

At S620, the size of the corresponding sequences $SQ_1$ and $SQ_m$ are compared to each other. If the sizes of the sequences $SQ_1$ and $SQ_m$ are not the same, execution proceeds with S630. Otherwise, at S640, the values of global time stamps respective of I/B/P sequences $SQ_1$ and $SQ_m$ are compared to each other. If the difference in time between the global time stamps of the respective sequences is smaller than the time shift X between the streams $S_1$ and $S_m$, at S650, the requested OTT stream is declared to be a live OTT stream. Otherwise, execution proceeds to S630.

Figure 7:
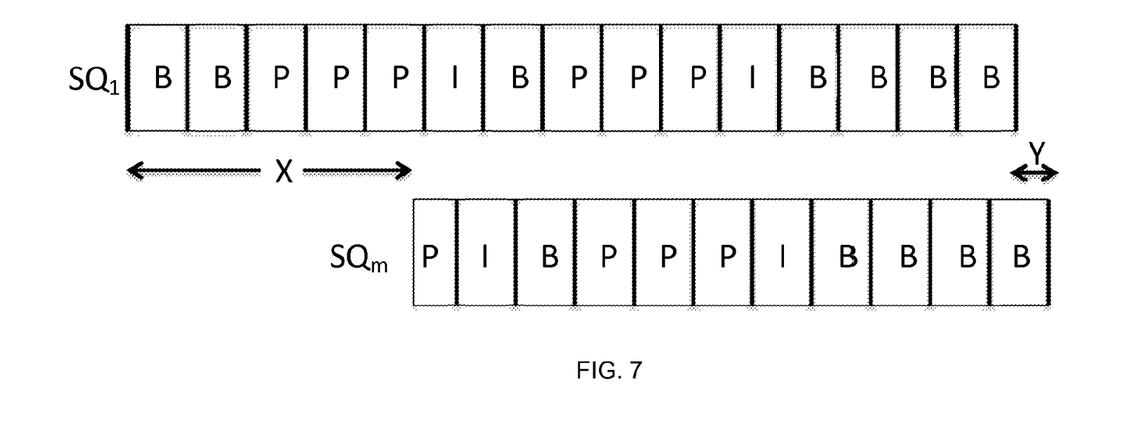
FIG. 7 illustrates I/B/P frame sequences utilized for detection of a live OTT stream.

FIG. 7 illustrates exemplary and non-limiting I/B/P frame sequences $SQ_1$ and $SQ_m$. In this example, the sequences are indicative that the requested OTT stream is a live OTT stream. In the example shown in FIG. 7, the order of the I/B/P frame sequences $SQ_1$ and $SQ_P$ is identical such that their sizes are identical. In addition, the time shift 'Y' between the sequences is smaller than the time shift 'X' between the respective OTT streams $S_1$ and $S_m$, i.e., Y<<X.

Figure 8:
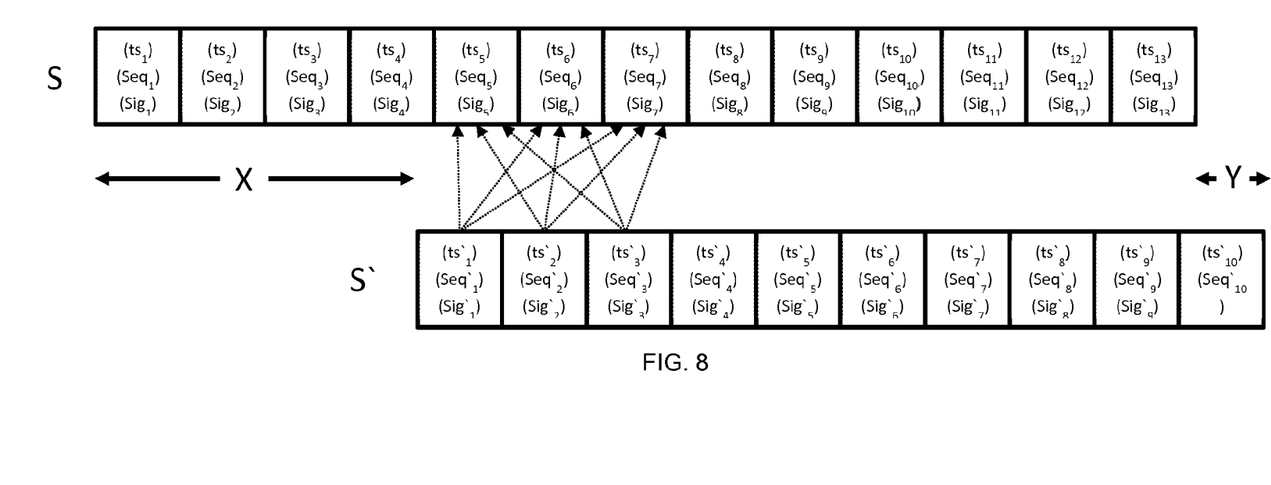
FIG. 8 illustrates segment tags utilized for detection of a live OTT stream.

FIG. 8 illustrates another embodiment, the determination of live OTT streams may be based on the comparisons between metadata respective of each of the streams. In this embodiment, the time shift between two OTT streams is limited to at least a size of a player's buffer. For example, in a HLS delivery protocol, such buffer size should correspond to video segments duration in the HLS protocol.

For the last 'R' segments (where R is equal to the buffer size), listed in the metadata, a segment "tag" is computed. The segment tag is the concatenation of the following parameters: 1) segment first appearance timestamp (the wall-clock time when the segment first appeared in the meta-data); 2) segment sequence number according to the meta-data; 3) segment relative time-stamp according to the meta-data (e.g., accumulated segment duration since the beginning of a session); and 4) segment signature, i.e. the hash function on part of the segment (e.g., SHA-1 on the first 50K of the segment).

A sequence of segment tags is computed for each stream (S and S'). In an embodiment, the segment tags are matched to each other using, for example, the stream analyzer 150. The segment tags of include a session segment wallclock timestamp ($ts_n$, $ts'_n$); a session segment playlist sequence ($Seq_n$, $Seq'_n$); and a session segment content signature ($Sig_n$, $Sig'_n$).

If the tags sequence substantially match each other with a maximal shift of the player buffer 'X', as shown in FIG. 8, the stream S may be determined to be a broadcast of a live OTT stream.

The steps of a method or algorithm described in connection with the embodiments disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some embodiments, any suitable computer-program product may comprise a computer-readable medium comprising code executable (e.g., executable by at least one computer) to provide functionality relating to one or more of the embodiments of the disclosure. In some embodiments, a computer program product may comprise packaging materials. Furthermore, a non-transitory computer readable medium is any computer readable medium except for a transitory propagating signal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some embodiments computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some embodiments computer-readable medium may comprise transitory computer readable medium (e.g., comprising a signal). Combinations of the above should also be included within the scope of computer-readable media. It should be appreciated that a computer-readable medium may be implemented in any suitable computer-program product. Although particular embodiments are described herein, many variations and permutations of these embodiments fall within the scope of the disclosure.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the description.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope consistent with the principles and novel features disclosed herein.

What is claimed is:

1. A method for detecting a live over-the-top (OTT) stream, comprising:
    analyzing a received request for an OTT stream to determine whether the requested OTT stream is suspected as a live OTT stream;
    requesting a plurality of time-shifted OTT streams respective of the requested OTT stream when the analysis of the received request indicates that the requested OTT stream is suspected as a live OTT stream; and
    analyzing the plurality of time-shifted OTT streams based in part on at least one time shift between the plurality of time-shifted OTT streams to determine whether the requested OTT stream is a live OTT stream.

2. The method of claim 1, wherein analyzing the received request further comprises:
    applying a filter to determine if the requested OTT stream is suspected as a live OTT stream;
    extracting at least a content identification (ID) from the suspected live OTT stream;
    counting a number of requests to a stream having the extracted content ID; and
    triggering the analysis of the plurality of time-shifted OTT streams when the number of requests exceeds a predefined threshold.

3. The method of claim 2, further comprising:
    transferring the received request to an OTT content server if the requested OTT stream is not suspected as a live OTT stream.

4. The method of claim 3, wherein applying a filter further comprising:
    searching for identifiers indicating that the requested OTT stream is for a live OTT stream.

5. The method of claim 4, wherein the identifiers include at least one of: a port identification, a type of the request, a source of the request, a video-on-demand identifier, a play list, and a master play list.

6. The method of claim 2, wherein the analysis of the requested OTT stream is based on a protocol utilized to stream the OTT stream.

7. The method of claim 6, wherein the protocol is any one of: real time messaging protocol (RTMP), hypertext transfer protocol (HTTP) live streaming (HLS) protocol, real time streaming protocol (RTSP), HTTP dynamic streaming, and moving picture experts group (MPEG)-dynamic adaptive streaming over HTTP (DASH).

8. The method of claim 2, wherein analyzing the plurality of time-shifted OTT streams further comprising:
    extracting a bit stream from each of the analyzed time-shifted OTT streams;
    comparing the extracted bit streams to each other; and
    determining the requested stream to be a live stream, when the extracted bit streams are substantially matched and no time-shift between the extracted bit streams is greater than or equal to the corresponding time-shift between the plurality of time-shifted OTT streams.

9. The method of claim 8, wherein each extracted bit stream is at least an I/B/P frame sequence.

10. The method of claim 1, further comprising:
    comparing metadata associated with each of the plurality of time-shifted OTT streams; and
    determining the request stream to be a live OTT stream when metadata associated with each of the plurality of time-shifted OTT streams are substantially matched to each other.

11. The method of claim 1, wherein the OTT live stream further includes a linear OTT stream and a replicated OTT stream.

12. A non-transitory computer readable medium having stored thereon instructions for causing one or more processing units to execute the method according to claim 1.

13. A system for detecting a live over-the-top (OTT) stream, comprising:
    a processing unit; and
    a memory, the memory containing instructions that, when executed by the processing unit, configure the system to:
    analyze a received request for an OTT stream to determine whether the requested OTT stream is suspected as a live OTT stream;
    request a plurality of time-shifted OTT streams respective of the requested OTT stream, when the analysis of the received request indicates that the requested OTT stream is suspected as a live OTT stream; and
    analyze the plurality of time-shifted OTT streams based in part on at least one time shift between the plurality of time-shifted OTT streams to determine whether the requested OTT stream is a live OTT stream.

14. The system of claim 13, wherein the system is further configured to:
    apply a filter to determine if the requested OTT stream is suspected as a live OTT stream;
    extract at least a content identification (ID) from the suspected live OTT stream;
    count a number of requests to a stream having the extracted content ID; and
    trigger the analysis of the plurality of time-shifted OTT streams when the number of requests exceeds a predefined threshold.

15. The system of claim 14, wherein the system is further configured to:
    transfer the received request to an OTT content server if the requested OTT stream is not suspected as a live OTT stream.

16. The system of claim 14, wherein the system is further configured to:
    search for identifiers indicating that the received request is for a live OTT stream.

17. The system of claim 16, wherein the identifiers include at least one of: a port identification, a type of the request, a source of the request, a video-on-demand identifier, a play list, and a master play list.

18. The system of claim 14, wherein the analysis of the received request is based on a protocol utilized to stream the OTT stream.

19. The system of claim 18, wherein the protocol is any one of: real time messaging protocol (RTMP), hypertext transfer protocol (HTTP) live streaming (HLS) protocol, real time streaming protocol (RTSP), HTTP dynamic streaming, and moving picture experts group (MPEG)-dynamic adaptive streaming over HTTP (DASH).

20. The system of claim 14, wherein the system is further configured to:
    extract a bit stream from each of the plurality of time-shifted OTT streams;
    compare the extracted bit streams to each other; and
    determine the requested OTT stream to be a live stream when the extracted bit streams are substantially matched and no time-shift between the extracted bit streams is greater than or equal to the corresponding time-shift between the plurality of time-shifted OTT streams.

21. The system of claim 20, wherein each extracted bit stream is at least an I/B/P frame sequence.

22. The system of claim 20, wherein the system is further configured to:
    compare metadata associated with each of the plurality of time-shifted OTT streams; and
    determine the requested OTT stream to be a live OTT stream when metadata associated with each of the plurality of time-shifted OTT streams are substantially matched.

23. The system of claim 13, wherein the OTT live stream further includes a linear OTT stream and a replicated OTT stream.

24. An apparatus, comprising:
    a processing unit; and
    a memory, the memory containing instructions that, when executed by the processing unit, configure the system to:
    receive a request for an over-the-top (OTT) stream;
    apply a filter to determine if the requested OTT stream is suspected as a live OTT stream;
    upon determining that the requested OTT stream is suspected as a live OTT stream, requesting a plurality of time-shifted OTT streams respective of the requested OTT stream;
    extract at least a content identification (ID) from the suspected live OTT stream;
    count a number of requests to a stream having the extracted content ID; and
    trigger the analysis of the plurality of time-shifted OTT streams when the number of requests exceed a predefined threshold, wherein the analysis is based in part on at least one time shift between streams of the plurality of time-shifted OTT streams.

25. An apparatus, comprising:
    a processing unit; and
    a memory, the memory containing instructions that, when executed by the processing unit, configure the system to:
    analyze a received request for an over-the-top (OTT) stream to determine whether the requested OTT stream is suspected as a live OTT stream;
    request a plurality of time-shifted over-the-top (OTT) streams respective of the requested OTT stream when the analysis indicates that the requested OTT stream is suspected as a live OTT stream;
    extract a bit stream from each of the plurality of time-shifted OTT streams;
    compare the extracted bit streams to each other based in part on at least one time shift between streams of the plurality of time-shifted OTT streams; and
    determine the requested OTT stream to be a live stream if the extracted bit streams are substantially matched.

* * * * *